(12) United States Patent
Ramaswamy

(10) Patent No.: US 8,302,120 B2
(45) Date of Patent: Oct. 30, 2012

(54) METHODS AND APPARATUS TO MONITOR ADVERTISEMENT EXPOSURE

(75) Inventor: Arun Ramaswamy, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 513 days.

(21) Appl. No.: 12/204,297

(22) Filed: Sep. 4, 2008

(65) Prior Publication Data
US 2009/0210892 A1 Aug. 20, 2009

Related U.S. Application Data

(60) Provisional application No. 61/029,744, filed on Feb. 19, 2008.

(51) Int. Cl.
*H04H 60/33* (2008.01)
(52) U.S. Cl. .......................................... 725/10; 709/223
(58) Field of Classification Search ................ 725/9–21; 709/217–231
See application file for complete search history.

(56) References Cited

U.S. PATENT DOCUMENTS

| | | |
|---|---|---|
| 4,718,106 A | 1/1988 | Weinblatt |
| 4,750,213 A | 6/1988 | Novak |
| 4,973,952 A | 11/1990 | Malec et al. |
| 5,287,266 A | 2/1994 | Malec et al. |
| 5,457,807 A | 10/1995 | Weinblatt |
| 5,532,732 A | 7/1996 | Yuen et al. |
| 5,594,934 A | 1/1997 | Lu et al. |
| 5,630,203 A | 5/1997 | Weinblatt |
| 5,659,350 A | 8/1997 | Hendricks et al. |
| 5,668,917 A | 9/1997 | Lewine |
| 5,812,732 A | 9/1998 | Dettmer et al. |
| 5,821,513 A | 10/1998 | O'Hagan et al. |
| 5,872,588 A | 2/1999 | Aras et al. |
| 5,948,061 A | 9/1999 | Merriman et al. |
| 5,966,696 A | 10/1999 | Giraud |
| 5,991,735 A | 11/1999 | Gerace |
| 6,006,197 A | 12/1999 | d'Eon et al. |
| 6,091,956 A | 7/2000 | Hollenberg |
| 6,100,941 A | 8/2000 | Dimitrova et al. |
| 6,108,637 A | 8/2000 | Blumenau |
| 6,177,931 B1 * | 1/2001 | Alexander et al. .............. 725/52 |
| 6,285,818 B1 | 9/2001 | Suito et al. |

(Continued)

FOREIGN PATENT DOCUMENTS

EP 1045547 10/2000

(Continued)

OTHER PUBLICATIONS

European Search Report, issued in EP Application No. 09 002 372.2-1238, completed May 25, 2009, 3 pages.

(Continued)

*Primary Examiner* — Annan Shang
(74) *Attorney, Agent, or Firm* — Hanley, Flight and Zimmerman, LLC

(57) ABSTRACT

Methods and apparatus to monitor advertisement exposure are disclosed. An example method includes determining via a meter that a media content segment was presented at a media content presentation device and determining via an activity monitor different than the meter that a computing resource related to the media content segment was accessed by outputting an indication of an association between the computing resource access and the media content presentation after the presentation of the media content segment.

24 Claims, 10 Drawing Sheets

U.S. PATENT DOCUMENTS

| | | | |
|---|---|---|---|
| 6,370,629 | B1 | 4/2002 | Hastings et al. |
| 6,386,450 | B1 | 5/2002 | Ogasawara |
| 6,457,010 | B1* | 9/2002 | Eldering et al. ............... 1/1 |
| 6,470,386 | B1 | 10/2002 | Combar et al. |
| 6,477,508 | B1 | 11/2002 | Lazar et al. |
| 6,581,025 | B2 | 6/2003 | Lehman |
| 6,584,375 | B2 | 6/2003 | Bancroft et al. |
| 6,587,835 | B1 | 7/2003 | Treyz et al. |
| 6,606,605 | B1 | 8/2003 | Kolls |
| 6,647,269 | B2 | 11/2003 | Hendrey et al. |
| 6,698,020 | B1* | 2/2004 | Zigmond et al. ............ 725/34 |
| 6,708,335 | B1* | 3/2004 | Ozer et al. .................. 725/20 |
| 6,745,011 | B1 | 6/2004 | Hendrickson et al. |
| 6,837,436 | B2 | 1/2005 | Swartz et al. |
| 6,912,507 | B1 | 6/2005 | Phillips et al. |
| 6,912,545 | B1 | 6/2005 | Lundy et al. |
| 6,934,508 | B2 | 8/2005 | Ceresoli et al. |
| 6,944,447 | B2 | 9/2005 | Portman et al. |
| 6,958,710 | B2 | 10/2005 | Zhang et al. |
| 6,968,178 | B2 | 11/2005 | Pradhan et al. |
| 6,983,139 | B2 | 1/2006 | Dowling et al. |
| 6,993,245 | B1 | 1/2006 | Harville |
| 7,051,038 | B1 | 5/2006 | Yeh et al. |
| 7,069,238 | B2 | 6/2006 | I'Anson et al. |
| 7,089,575 | B2 | 8/2006 | Agnihotri et al. |
| 7,127,261 | B2 | 10/2006 | Van Erlach |
| 7,149,549 | B1 | 12/2006 | Ortiz et al. |
| 7,155,210 | B2 | 12/2006 | Benson |
| 7,206,647 | B2 | 4/2007 | Kumar |
| 7,206,753 | B2 | 4/2007 | Bancroft et al. |
| 7,227,498 | B2 | 6/2007 | Soliman |
| 2001/0037232 | A1 | 11/2001 | Miller |
| 2001/0039658 | A1* | 11/2001 | Walton ........................ 725/51 |
| 2002/0002504 | A1 | 1/2002 | Engel et al. |
| 2002/0046104 | A1 | 4/2002 | Kaddeche et al. |
| 2003/0126013 | A1 | 7/2003 | Shand |
| 2003/0126597 | A1 | 7/2003 | Darby et al. |
| 2003/0226142 | A1 | 12/2003 | Rand |
| 2004/0073538 | A1 | 4/2004 | Leishman et al. |
| 2004/0073915 | A1 | 4/2004 | Dureau |
| 2004/0117259 | A1* | 6/2004 | Morrisroe et al. ............ 705/14 |
| 2005/0035857 | A1 | 2/2005 | Zhang et al. |
| 2005/0203798 | A1 | 9/2005 | Jensen et al. |
| 2005/0234774 | A1 | 10/2005 | Dupree |
| 2005/0264430 | A1 | 12/2005 | Zhang et al. |
| 2006/0106674 | A1 | 5/2006 | Muller |
| 2006/0287913 | A1 | 12/2006 | Baluja |
| 2007/0288476 | A1 | 12/2007 | Flanagan, III et al. |
| 2007/0294057 | A1 | 12/2007 | Crystal et al. |
| 2007/0294132 | A1 | 12/2007 | Zhang et al. |
| 2007/0294705 | A1 | 12/2007 | Gopalakrishnan et al. |
| 2007/0294706 | A1 | 12/2007 | Neuhauser et al. |
| 2008/0077502 | A1 | 3/2008 | Boyd |
| 2008/0086356 | A1 | 4/2008 | Glassman et al. |
| 2008/0134255 | A1* | 6/2008 | Ferris et al. .................. 725/62 |
| 2008/0319850 | A1* | 12/2008 | Shaul et al. .................. 705/14 |

FOREIGN PATENT DOCUMENTS

| | | |
|---|---|---|
| EP | 1326185 | 7/2003 |
| EP | 1744276 | 1/2007 |
| JP | 11008585 | 1/1999 |
| JP | 2000307530 | 11/2000 |
| JP | 2005086308 | 3/2005 |
| WO | 9831114 | 7/1998 |
| WO | 2006026736 | 3/2006 |
| WO | 2008003089 | 1/2008 |

OTHER PUBLICATIONS

Written Opinion of the European Search Report, issued in EP Application No. 09 002 372.2-1238, completed May 25, 2009, 3 pages.

Patent Cooperation Treaty, "International Search Report," issued by the International Searching Authority in connection with counterpart PCT application No. PCT/US2007/072544, mailed Aug. 22, 2008 (2 pages).

Patent Cooperation Treaty, "Written Opinion of the International Searching Authority," issued by the International Searching Authority in connection with counterpart PCT application No. PCT/US2007/072544, mailed Aug. 22, 2008 (3 pages).

Yeung et al., "A Comparative Study on Location Tracking Strategies in Cellular Mobile Radio Systems," published on Nov. 14, 1995, pp. 22, 24, 26, 28.

Handy et al., "Lessons Learned from Developing a Bluetooth Multiplayer-Game," Institute of Applied Microelectronics and Computer Science, University of Rostock, 2nd International Conference on Pervasive Computing, Workshop on Gaming Applications in Ubiquitous Computing Environments, Wien, Österreich, Apr. 18-23, 2004 (7 pages).

Battiti et al., "Location-Aware Computing: A Neural Network Model for Determining Location in Wireless Lans", Department of Information and Communication Technology, University of Trento, Feb. 22, 2002 (17 pages).

Azondekon et al., "Service Selection in Networks Based on Proximity Confirmation Using Infrared", International Conference on Telecommunications (ICT), Beijing, 2002, pp. 1-4.

Bahl et al., "A Software System for Locating Mobile Users: Design, Evaluation, and Lessons", Technical Report MSR-TR-2000-12, Microsoft Research, Feb. 2000, pp. 1-13.

International Preliminary Report on Patentability, Issued in PCT/US2007/072544, mailed Jan. 6, 2009, 4 pages.

* cited by examiner

METHODS AND APPARATUS TO MONITOR ADVERTISEMENT EXPOSURE

RELATED APPLICATIONS

This patent claims the benefit of U.S. Provisional Patent Application No. 61/029,744, filed Feb. 19, 2008, entitled "METHODS AND APPARATUS TO MONITOR IN-HOME ADVERTISEMENT EXPOSURE" the disclosure of which is incorporated by reference in its entirety.

FIELD OF THE DISCLOSURE

The present disclosure pertains to monitoring media content and, more particularly, to methods and apparatus to monitor advertisement exposure.

BACKGROUND

Consumers are exposed to advertisements via many different sources. An example source of advertisements is television broadcasts. There are currently many methods for monitoring advertisements to determine how many consumers were exposed to advertisements. For example, a monitoring system may determine the number and identity of consumers in the same room as a source that is presenting media content (e.g., a television showing a television advertisement). Using this information an interested party can determine the number and demographics of consumers that were exposed to a particular advertisement.

Businesses that advertise products and services can analyze the effectiveness of advertisements by analyzing sales information prior-to and after advertisements have been presented. For example, a business can determine that an advertisement is effective if sales of a product or service increased following an advertisement. This analysis can be performed at a global, national, or market level depending on how specifically advertisement and sales information is monitored.

DETAILED DESCRIPTION

Figure 1:
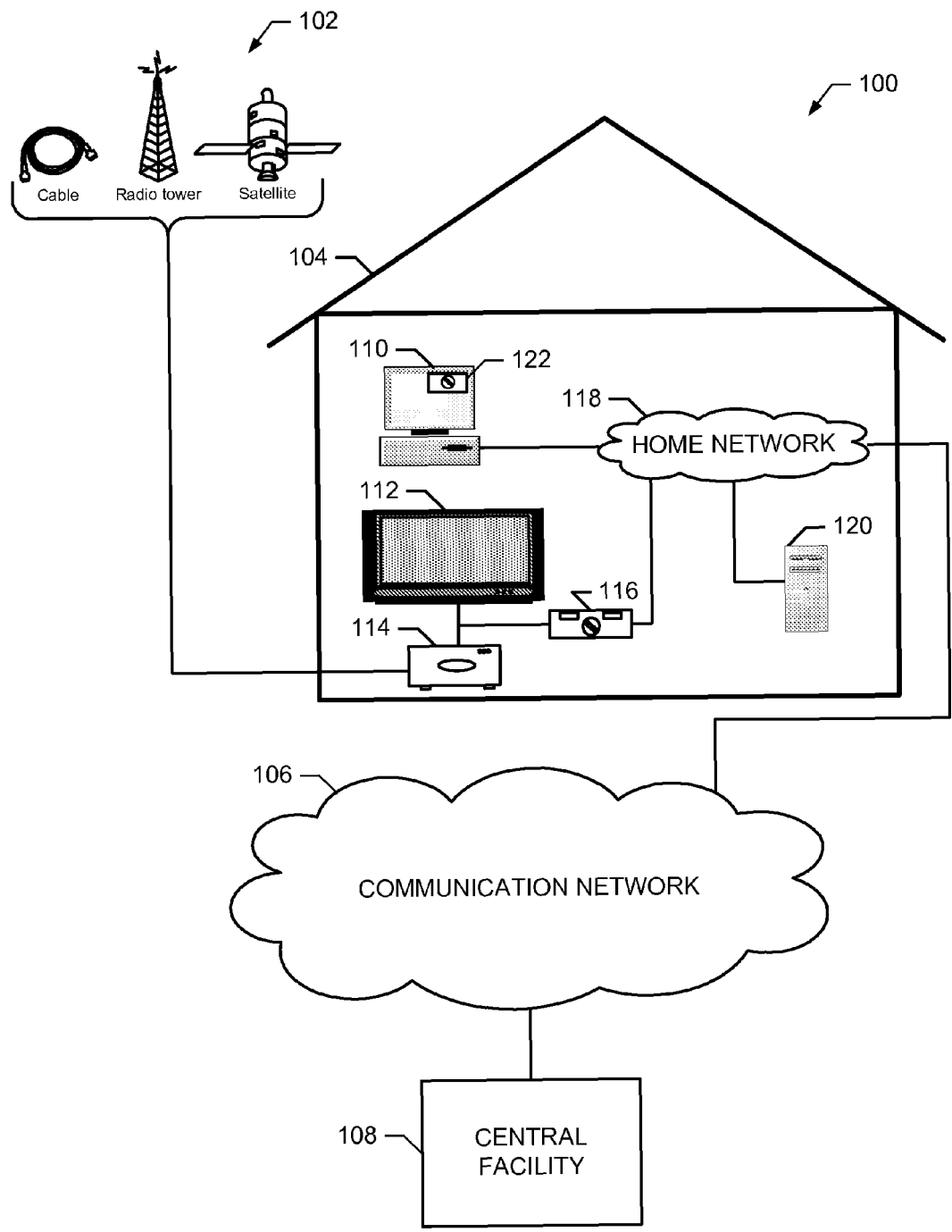
FIG. 1 is a block diagram of an example system to monitor advertisement exposure.

FIG. 1 is a block diagram of an example system 100 to monitor advertisement exposure. The example system 100 includes a source of media content 102, a household 104, a communication network 106, and a central facility 108. As described in further detail herein, according to the illustrated example, the exposure to television advertisements in the household 104 is monitored. In addition, activity at a computer 110 is monitored. Information about exposure to the television advertisements and the computer activity is sent via the communication network 106 to the central facility 108 for analysis. For example, according to an example implementation, exposure to information about the advertisements is compared with information about the computer activity to locate and report relationships among exposure to the advertisements and the computer activity. For example, a report may identify instances where the presentation of a television advertisement was shortly followed by a user visiting a webpage associated with the content of the television advertisement thereby suggesting that the presentation of the television advertisement was the impetus for the visit to the webpage.

The source of media content 102 of the illustrated example is one of a cable television network, an over-the-air distribution television network, or a satellite television distribution network that provides media content to the household 104. Of course, the source of the media content 102 may alternatively include more than one source of media content and may include any other type of distribution system. For example, the source of media content 102 may include internet distributed media content (e.g., video and/or audio), a radio distribution network (e.g., satellite, over-the-air, etc.), a physical medium based media distribution network (e.g., media content distributed on a compact disc, a digital versatile/video disc, a flash memory, a Blu-ray™ disc, etc.), or any other type of distribution network.

The household 104 of the illustrated example is a home in which a user uses the computer 110 (e.g., to consume media content, to browse the internet, etc.) and consumes media content at a television 112. While the household 104 of the illustrated example is a home, the household 104 may alternatively be a business location, a public location (e.g., a library), etc.

The example household 104 includes the computer 110, the television 112, a receiver 114, a meter 116, a home network 118, and a home server 120.

The computer 110 of the illustrated example is a personal computer that allows a user to consume media content, browse the internet, and execute applications. The computer 110 of the illustrated example may be a personal computer, a laptop computer, a personal digital assistant, a video gaming system, a mobile phone, a cellular phone, or any other type of computing device.

The computer 110 of the illustrated example includes an activity monitor 122. The example activity monitor 122 is implemented by software installed on the computer 110 that monitors the activity of a user of the computer and transmits information about the activity to the home server 120. For example, the activity monitor 122 monitors a user's offline activity (e.g., exposure to and/or consumption of media content, executing applications, etc.) and a user's online activity (e.g., browsing webpages on the internet). The software for the example activity monitor 122 may be software installed by a representative of a monitoring organization, software installed by a user that downloads the software from the internet, a plug-in executed in a browser, software that is installed by a user that installs the software from a storage medium (e.g., a floppy disk, a compact disc, a digital versatile disc, a flash memory, etc.), or by any other means. While the example activity monitor 122 is implemented by software installed on the computer 110, the activity monitor 122 may alternatively be implemented by a standalone monitoring device that is associated with the computer (e.g., a device physically attached to the computer or a device that includes sensors that monitor the computer without being attached to the computer (e.g., a camera)). Additionally or alternatively, the activity monitor 122 may be integrated with another device (e.g., the home server 120 or the meter 116). Example implementations of the activity monitor 122 are described in further detail in conjunction with FIGS. 3 and 7.

The television 112 of the illustrated example receives media content for presentation from the example receiver 114. The example receiver 114 (e.g., a set top box) receives media content from the content sources 102 and transmits the content to the television 112 in a format that the television can accept. For example, the receiver 114 may receive satellite broadcast signals, decode the satellite broadcast signals, decrypt the decoded signals, convert the decrypted signals to a digital television signal, and transmit the digital television signal to the television. Alternatively, the system 100 may not include a receiver 114 and the television 112 may receive media content directly from the content sources 102. While the television 112 and the receiver 114 have been described as handling television signals (e.g., audio and video), the system 100 may additionally or alternatively handle other types of media content such as, for example, radio, internet media content broadcasts/streams, etc.

The meter 116 of the illustrated example monitors media content transmitted from the receiver 114 to the television 112. Among other things, the example meter 116 analyzes the received media content to extract advertisements and/or identifying information associated with advertisements and sends the extracted information to the home server 120. While the example meter 116 receives media content transmitted from the receiver 114 to the television 112 via a splitter or the like, the meter 116 may alternatively receive presented media content from the television 112 (e.g., using an output of the television 112, using a camera directed at the television 112, by detecting audio output by the television or by extracting one or more program identification codes associated with the media content and/or a characteristic signature of the media content, etc.) and/or media content directly from the content sources 102. Additionally or alternatively, the meter 116 may be capable of detecting the state of the television 112 (e.g., whether the television is turned on or off) and/or of detecting and/or analyzing information about people watching the television and/or in the vicinity of the television.

Figure 2:
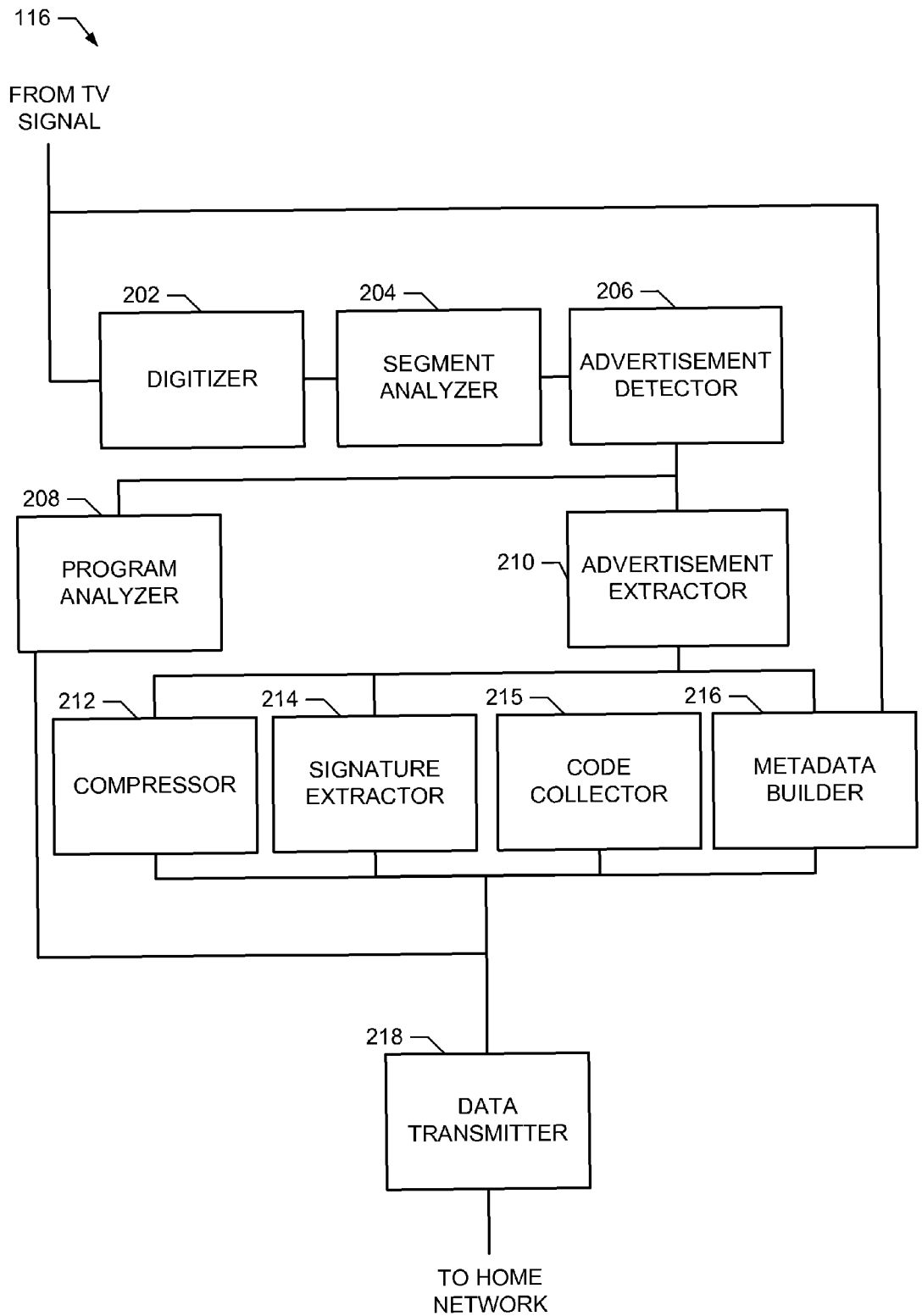
FIG. 2 is a block diagram of an example implementation of the meter of FIG. 1.
Figure 6:
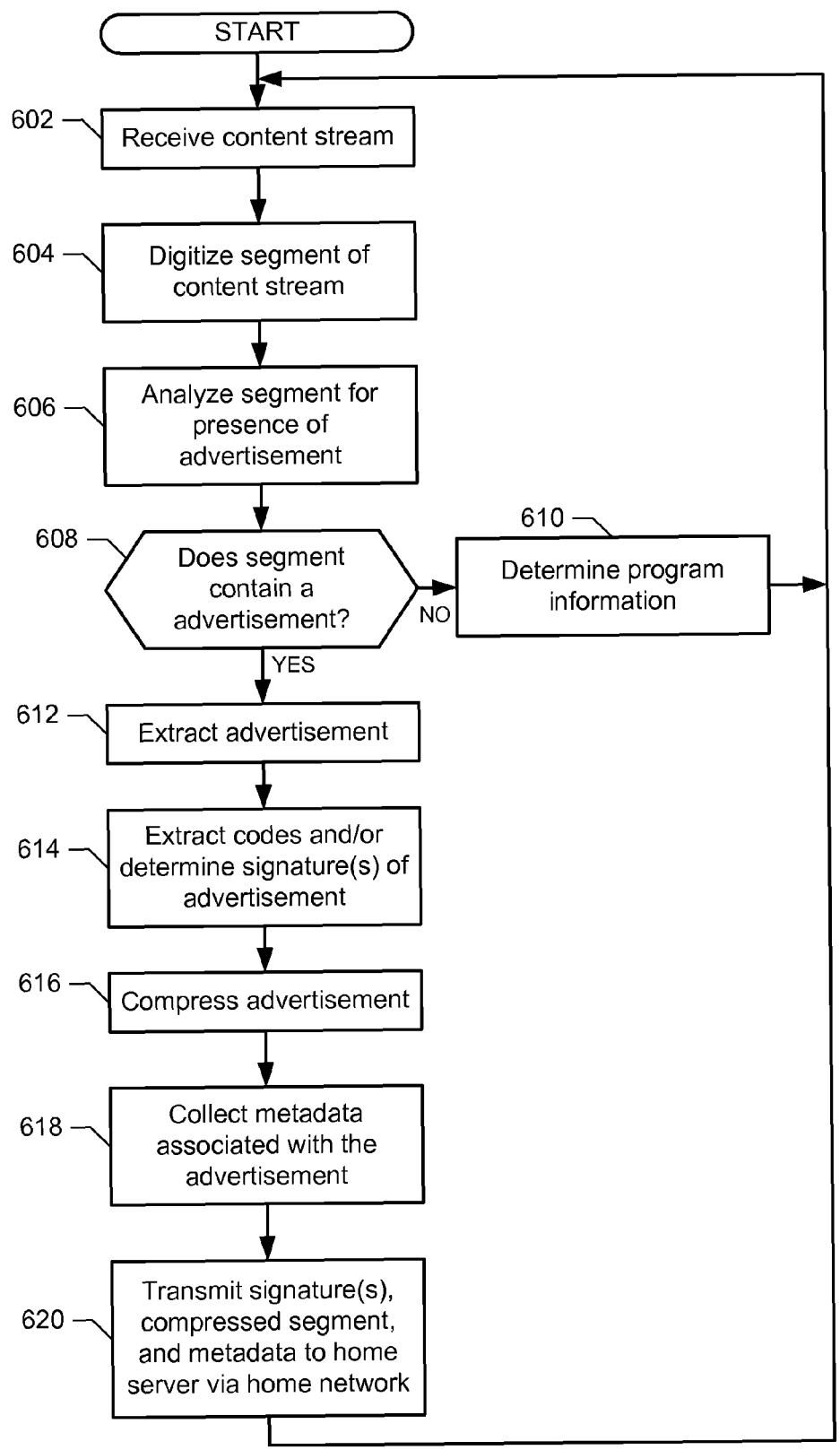
FIG. 6 is a flowchart representative of example machine readable instructions that may be executed to implement the meter of FIG. 1.

An example implementation of the meter 116 is described in conjunction with FIGS. 2 and 6.

The home network 118 of the illustrated example enables communication between network elements in the household 104. For example, the home network 118 communicatively couples the computer 110, the activity monitor 122, the meter 116, and the home server 120. In addition, the home network of the illustrated example communicatively couples the network elements in the household 104 to the communication network 106 (e.g., the internet). For example, the home network 118 includes a gateway device that communicates with the communication network 106 via a service provider. While the example home network 118 is a local area network, the home network 118 may be implemented by any type of wired or wireless network such as, for example, a wireless network implemented according to Institute of Electrical and Electronics Engineers (IEEE) standard 802.11, a Bluetooth® wireless network, an Ethernet network, a cellular telephone network, any other type of wide area network, any other type of local area network, etc.

The home server 120 of the illustrated example receives monitoring information (e.g., advertising information, program identification information, tuning information, etc.) from the meter 116 and activity information from the activity monitor 122 and stores the received information. The example home server 120 of the illustrated example includes a database for storing received information. Alternatively, as described in further detail herein, the home server 120 may include any type of storage. The home server 120 of the illustrated example periodically or aperiodically transmits received information to the central facility 108. For example, the home server 120 may transmit the information according to a schedule, when the database is full, when a desired amount of information has been stored, upon a request from a user, upon a request from the central facility 108, etc.

While the example home server 120 is illustrated as a stand-alone server located in the household 104, the home server 120 may be integrated with another device in the household 104 or may be located at a location different from the household 104. For example, the capabilities of the home server 120 may be integrated with the computer 110 (e.g., software implementing the home server 120 may be installed on the computer 110).

Figure 4:
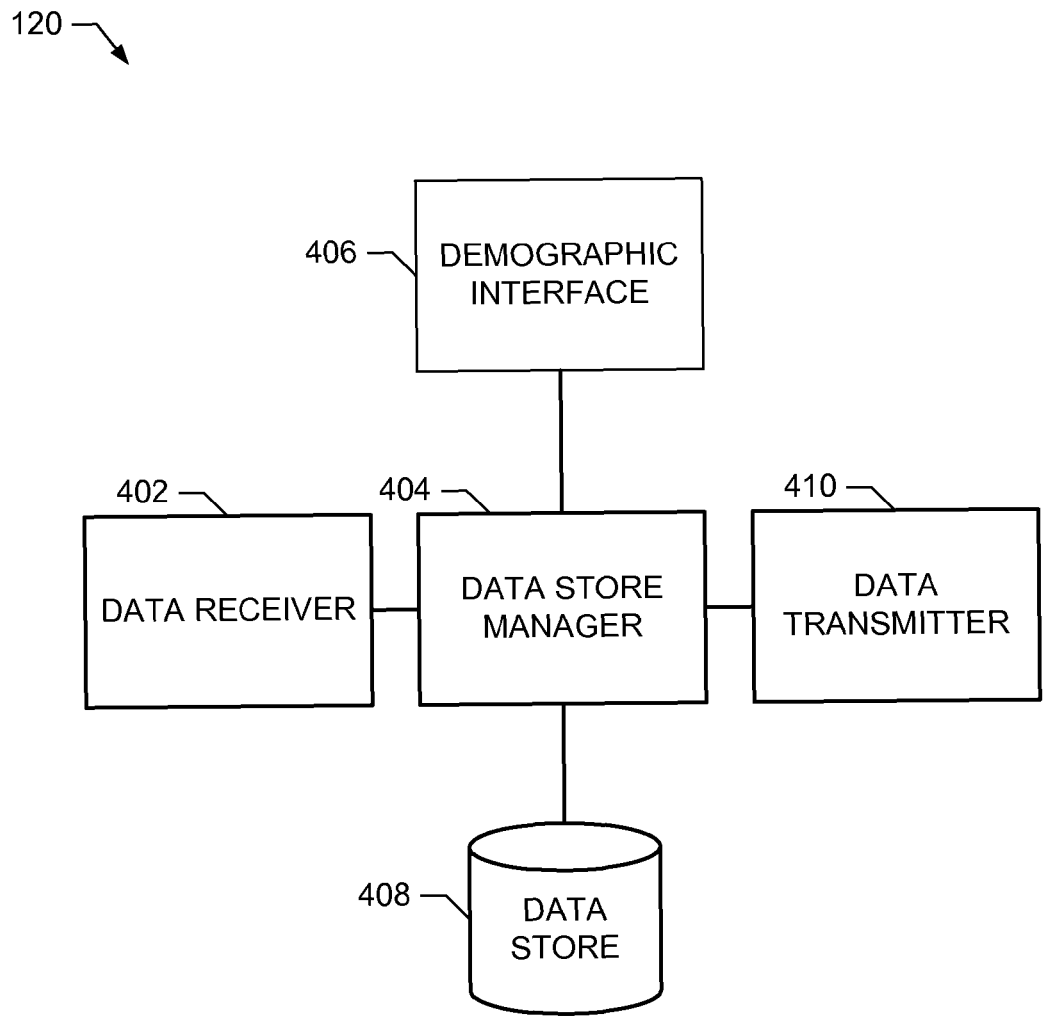
FIG. 4 is a block diagram of an example implementation of the home server of FIG. 1.
Figure 8:
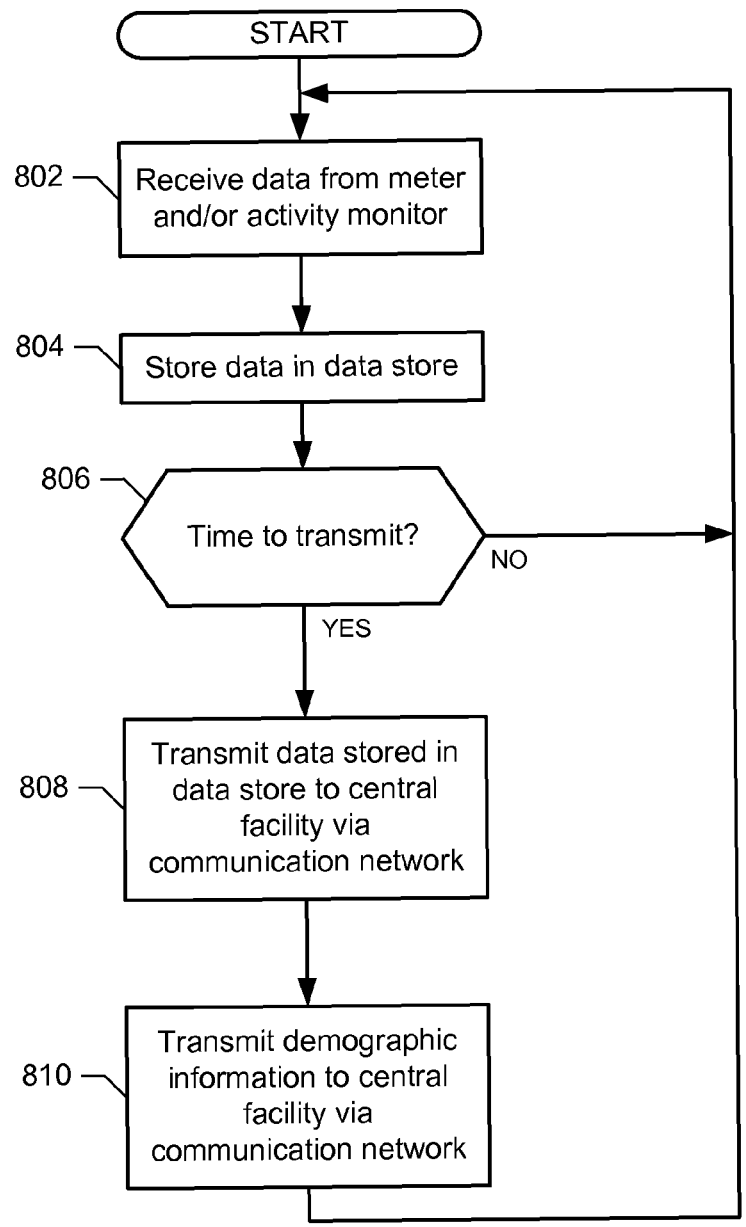
FIG. 8 is a flowchart representative of example machine readable instructions that may be executed to implement the home server of FIG. 1.

An example implementation of the home server 120 is described in further detail in conjunction with FIGS. 4 and 8.

The communication network 106 of the illustrated example enables communication between the home network 118 and the central facility 108. In addition, the example communication network 106 enables communication to the internet from the home network 118. While the example communication network 106 is a wide area network, the communication network 106 may be implemented by any type of wired or wireless network such as, for example, a wireless network implemented according to Institute of Electrical and Electronics Engineers (IEEE) standard 802.11, a Bluetooth® wireless network, an Ethernet network, a cellular telephone network, any type of service provider network, any other type of wide area network, and/or any other type of local area network.

The central facility 108 of the illustrated example receives monitoring information associated with the household 104 from the home server 120. The example central facility 108 analyzes the received monitoring information to determine ratings information (e.g., how many people were presented with the advertisement or a program with which the advertisement is associated, how many people of a particular demographic were presented with the advertisement, and/or program etc.) for advertisements and/or programs presented at the household 104 and to associate advertisement information with activity information logged by the activity monitor 122. For example, the example central facility 108 selects an advertisement and compares metadata associated with the advertisement to activity information that was logged within a desired timeframe (e.g., a 24-hour window) from the presentation of the advertisement. Based on the comparison, the example central facility 108 determines if the advertisement can be associated with any of the activity information (e.g., an advertisement for a computer maker can be associated with a visit to the website associated with the computer maker and/or with a competitor of the computer maker). The example central facility 108 then generates reports indicating the ratings information and/or the association between the advertisement information and the activity information.

Figure 5:
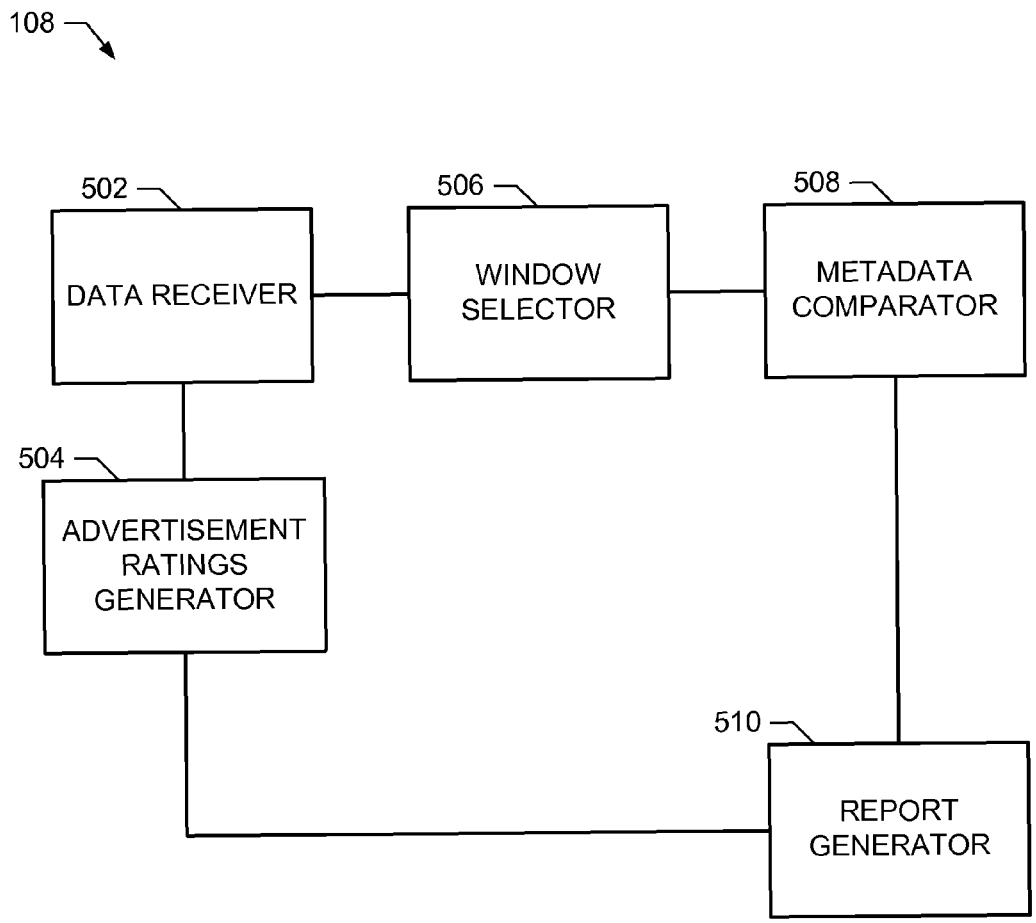
FIG. 5 is a block diagram of an example implementation of the central facility of FIG. 1.
Figure 9:
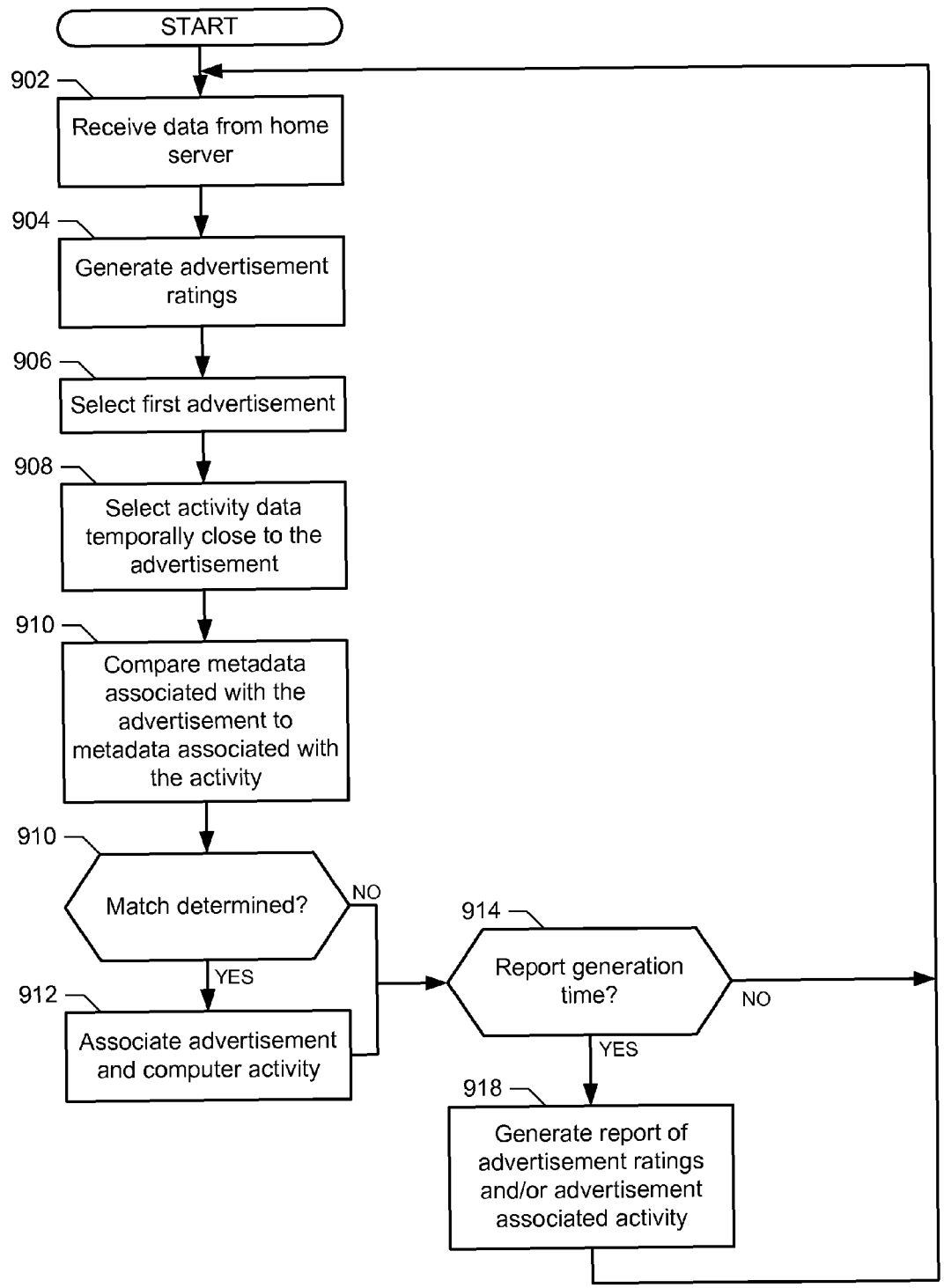
FIG. 9 is a flowchart representative of example machine readable instructions that may be executed to implement the central facility of FIG. 1.

An example implementation of the central facility is described in conjunction with FIGS. 5 and 9.

FIG. 2 is a block diagram of an example implementation of the meter 116 of FIG. 1. The meter 116 of the illustrated example includes a digitizer 202, a segment analyzer 204, an advertisement detector 206, a program analyzer 208, a commercial extractor 210, a compressor 212, a signature extractor 214, a code collector 215, a metadata builder 216, and a data transmitter 218.

The digitizer 202 of the illustrated example receives media content presented on a television (e.g., media content transmitted from the receiver 114 to the television 112 of FIG. 1) and digitizes segments of the media content. For example, the example digitizer 202 receives 180 seconds of media content in analog format and generates a digital representation of the 180 seconds of analog media content. Alternatively, if the digitizer 202 receives media content that is already in a usable digital format, the digitizer 202 may break the digital media content into segments (e.g., of 180 seconds or any other desired length).

The example segment analyzer 204 receives digitized segments of media content from the digitizer 202 and determines if the segment contains one or more commercials. The example segment analyzer 204 may use any type of available analysis to determine if commercials are present. Example techniques include:

a. monitoring for blank frames that indicate the start and end of a video clip, b. monitoring for silent audio segments that indicate the start and end of a video clip, c. monitoring for discontinuities in closed captioning data that indicates a change in the video clip, d. monitoring for the lack of closed captioning data that indicates an advertisement is playing rather than program content, e. monitoring for discontinuities in embedded audio codes (e.g., Nielsen's automated measurement of lineups (AMOL) codes or codes analogous thereto) that indicate a change in the video clip, f. monitoring for the lack of audio codes (e.g., program identification codes embedded and/or transmitted with content for audience measurements and/or other purposes) that indicates an advertisement is playing rather than a program, g. monitoring infrared or radio frequency commands sent by a remote control to the receiver 114 of the television 112 that indicate a change in channel, fast-forwarding, or rewinding, h. monitoring closed captioning data for information indicating that an advertisement is present, i. monitoring for embedded codes that are inserted only in commercials (e.g., codes inserted by the Audio Audit® system, codes inserted by the Nielsen® Sigma™ system, codes inserted by any Nielsen audio encoding system (NAES), or any other code insertion system), and/or j. determining one or more signature(s) for the segment and comparing the one or more signature(s) to a database of known advertisement signatures (e.g., a database that is updated by transmissions from the central facility 108).

The segment analyzer 204 of the illustrated example is capable of employing any or all of these techniques and transmits the results it develops to the advertisement detector 206 for further analysis. The segment analyzer 204 may utilize all or fewer than all of the forgoing techniques and/or use any number of additional techniques for generating an indication as to whether an advertisement is present in the segment.

The advertisement detector 206 of the illustrated example receives information from the segment analyzer 204 and detects whether the information indicates that an advertisement is present in a segment. For example, the example advertisement detector 206 weighs the results of some or all of the techniques used by the segment analyzer 204 to determine if the results indicate that one or more advertisements are present. If the advertisement extractor 206 determines that an advertisement is present, the advertisement detector 206 sends the segment and an identification to the advertisement detector 210. For example, the advertisement detector 206 may send an identification including the time or index of the start of each advertisement and the time or index of the end of each advertisement in the segment. If the advertisement detector 206 determines that a commercial is not present in the segment (i.e., the segment is a media content program), the segment is transmitted to the program analyzer 208 instead of the advertisement extractor 210.

When the program analyzer 208 of the illustrated example receives a segment from the advertisement detector 206 (e.g., when the segment does not include an advertisement), it analyzes the segment to extract information for determining the identity and/or source of the program. For example, the program analyzer 208 of the illustrated example extracts program codes using the Nielsen Active/Passive (A/P) encoding system. The codes may be program identification headers (PIDs) associated with digital television broadcasts or codes used for other purposes such as audience measurement. Alternatively, any technique for identifying media content programs and/or generating, extracting, and/or computing identifying information may be used. The example program analyzer 208 transmits the extracted information to the data transmitter 218. The example program analyzer 208 of the illustrated example then deletes the segment. Alternatively, the program analyzer 208 may store the segment for later analysis and/or may transmit the segment to the data transmitter 218.

When the advertisement extractor 210 of the illustrated example receives a segment from the advertisement extractor 206 (e.g., when the segment includes an advertisement), it extracts the advertisement from the segment. In other words, the example advertisement extractor 210 separates the portion of the segment associated with the advertisement from any portion(s) of the segment not associated with the advertisement. The advertisement extractor 210 then transmits the advertisement to the compressor 212, the signature extractor 214, the code collector 215, and the metadata builder 216 of the illustrated example. Additionally or alternatively, the advertisement extractor 210 may extract a portion of an advertisement from another segment that is adjacent to the current segment in time (e.g., a segment prior to the current segment or a segment following the current segment) if an advertisement is detected at the edge of a segment. While the example implementations of the meter 116 includes an advertisement extractor 210, alternative implementation of the meter 116 may not extract advertisements from segments and, thus, may not include the advertisement extractor 210.

The compressor 212 of the illustrated example receives the extracted advertisement from the advertisement extractor 210 and compresses the audio and video associated with the advertisement to reduce the amount of storage space needed to store the advertisement. For example, the compressor 212 may decrease the resolution of the advertisement, may decrease the color-depth of the advertisement, may eliminate frames from the advertisement (e.g., keep only every fourth frame), may transcode the content to a compressed encoding (e.g., encode the content in a Motion Pictures Experts Group (MPEG) compressed format), etc. The compressed advertisement is sent to the data transmitter 218 and thereafter transmitted to a home server (e.g., the home server 120 of FIG. 1) where the advertisement will be available for later analysis. For example, the advertisement may be viewed by a human to identify the advertisement (e.g., when automated detection techniques are not successful).

The signature extractor 214 of the illustrated example receives an advertisement from the advertisement extractor 210 and extracts and/or generates a signal representative of the advertisement (e.g., a fingerprint or signature) that preferably uniquely identifies the advertisement. In the illustrated example, the signature extractor 214 extracts one or more of an audio signature, a video signature, and/or a closed captioning signature from the advertisement. The signature extractor 214 sends the extracted signature to the data transmitter 118 for later transmission to, and analysis by, a central facility (e.g., the central facility 108 of FIG. 1).

The code collector 215 of the illustrated example receives an advertisement from the advertisement extractor and extracts codes associated with the media content. The code collector 215 may extract any type of code associated with the advertisement such as, for example, a watermark, a PID header, or any other information embedded in the media content, etc. and/or may retrieve identifying information from an external source (e.g., retrieve identifying information from the receiver 116 of FIG. 1). The code collector 215 sends the extracted code(s) to the data transmitter 118 for later transmission to, and analysis by, a central facility (e.g., the central facility 108 of FIG. 1).

The metadata builder 216 of the illustrated example requests and/or receives information about the advertisement extracted by the advertisement extractor 206 and sends the metadata information to the data transmitter 218. The example metadata information includes any information that: a) identifies the source of the advertisement, b) identifies the television channel or network on which the advertisement was shown, c) identifies the duration of the advertisement, d) identifies the time at which the advertisement was presented, e) identifies a user viewing the content, f) identifies a user's activity associated with the content (e.g., fast-forwarding through the advertisement), etc. For example, the example metadata builder 216 receives information from a signal transmitted from a receiver to a television (e.g., from the receiver 114 to the television 112) including the channel to which the receiver is tuned and any user activity associated with the advertisement. In addition, the example metadata builder 216 extracts information from the received advertisement such as the duration of the advertisement and the time at which the advertisement was presented. The example metadata builder 216 sends the collected metadata to the data transmitter 218 for association with the data from the compressor 212, the signature extractor 214 and/or the code collector 215.

The data transmitter 218 of the illustrated example receives information from the program analyzer 208, the compressor 212, the signature extractor 214, and/or the metadata builder 216 and transmits the information to a remote location (e.g., the home server 120 of FIG. 1). The data transmitter 218 of the illustrated example is implemented by a wired or wireless network card. However, any other communication device may be used to communicatively couple the meter 116 to a network (e.g., the home network 118).

Figure 3:
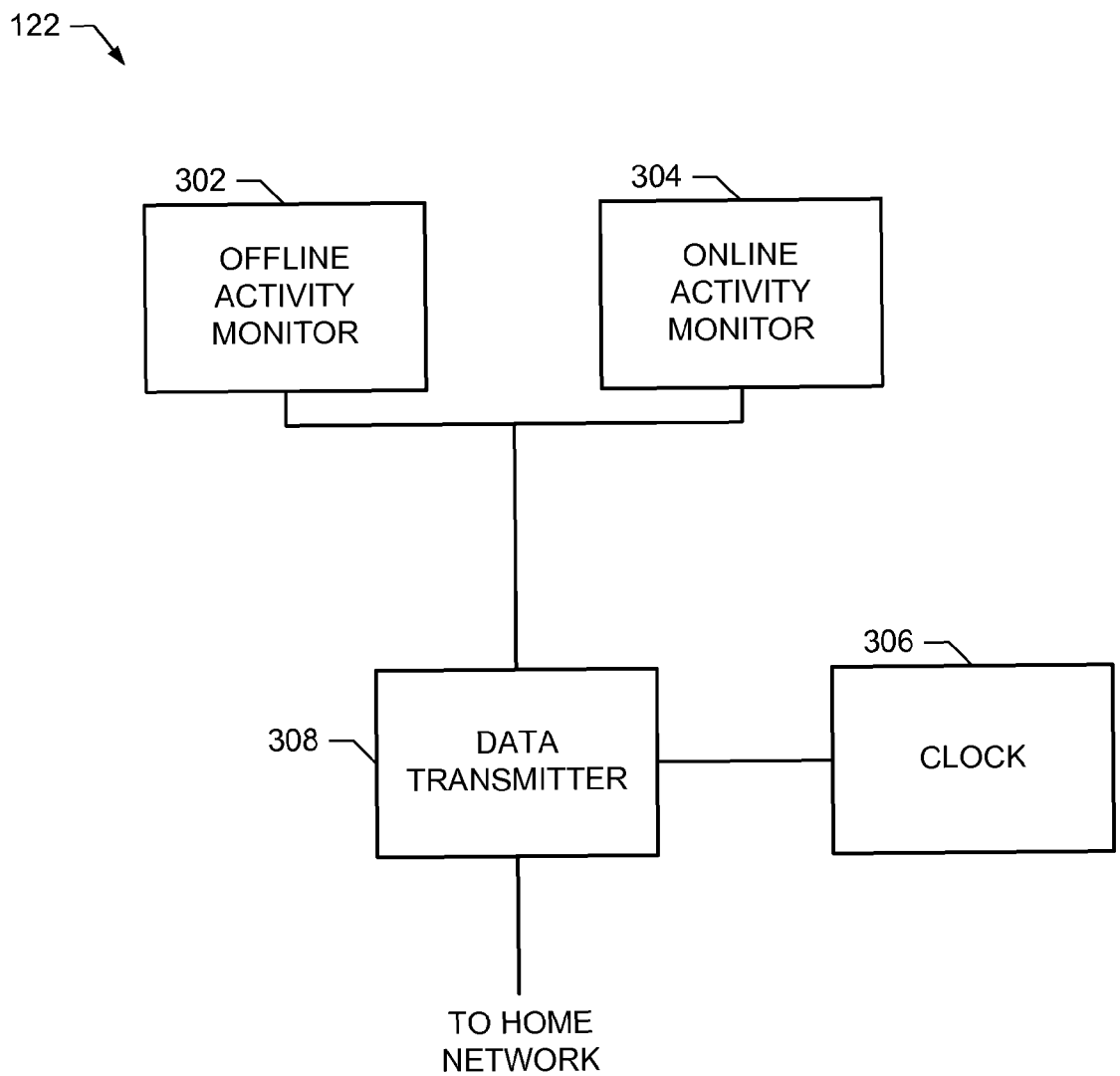
FIG. 3 is a block diagram of an example implementation of the activity monitor of FIG. 1.

FIG. 3 is a block diagram of an example implementation of the activity monitor 122 of FIG. 1. The example activity monitor 122 includes an offline activity monitor 302, an online activity monitor 304, a clock 306, and a data transmitter 308.

The offline activity monitor 302 of the illustrated example logs activity at a computer (e.g., the computer 110 of FIG. 1) where the activity is not online activity (e.g., not network related). For example, the offline activity monitor 302 may log a user executing a particular program on the computer, a user typing words or characters on the computer, a user configuring the computer, etc. The offline activity monitor 302 sends logged activity to the data transmitter 308.

The online activity monitor 304 of the illustrated example logs network related activity at the computer. The example online activity monitor 304 logs webpages (e.g., URLs) that a user requests at the computer and/or which are pushed to the computer (e.g., pop-up windows). Alternatively, the online activity monitor 304 may log any other type of online activity or computing resource access that occurs at the computer such as, for example, purchases made by the user online, purchases made at a bricks and mortar business for which notifications are received online (e.g., via an online credit card statement or an email message), purchases monitored by an AC Nielsen Home Scanner, messages sent online (e.g., emails or instant messages), advertisements viewed on the internet, etc. The online activity monitor 304 sends logged activity to the data transmitter 308.

The offline activity monitor 302 and the online activity monitor 304 of the illustrated example are separate. For example, the offline activity monitor 302 may be a software application that is installed on the computer and the online activity monitor 304 may be a plug-in that is installed in a browser. Alternatively, the offline activity monitor 302 and the online activity monitor 304 may be integrated as a single component. For example, the offline activity monitor 302 and the online activity monitor 304 may be implemented by a single software application installed on the computer.

The clock 306 of the illustrated example provides the current date and time (i.e., a timestamp) to the data transmitter 308 for association with log information received from the offline activity monitor 302 and/or the online activity monitor 304. The clock 306 may be excluded from the meter 122 when, for example, the offline activity monitor 302 and the online activity monitor 304 include timestamp capabilities.

The data transmitter 308 of the illustrated example receives log information from the offline activity monitor 302 and the online activity monitor 304 and timestamp information from the clock 306. The data transmitter 308 of the illustrated example is implemented by a wired or wireless network card. However, any other communication device may be used to communicatively couple the activity monitor 122 to a network (e.g., the home network 118).

FIG. 4 is a block diagram of an example implementation of the home server 120 of FIG. 1. The example home server 120 includes a data receiver 402, a data store manager 404, a demographic interface 406, a data store 408, and a data transmitter 410.

The data receiver 402 of the illustrated example receives advertisement and/or program information from a meter (e.g., the meter 116 of FIG. 1). The data receiver 402 also receives activity information from an activity monitor (e.g., the activity monitor 122 of FIG. 1). The data receiver 402 transmits the information to the data store manager 404. The data receiver 402 of the illustrated example is implemented by a wired or wireless network card. However, any other communication device may be used.

The data store manager 404 of the illustrated example receives advertisement information, program information, and/or activity information from the data receiver 402. The data store manager also receives demographic information from the demographic interface 406. The data store manager 404 associates demographic information with the advertisement and/or program information and stores the associated information in the data store 408. The data store manager 404 also forwards the stored information to the data transmitter 410 for transmission to a central facility.

The demographic interface 406 of the illustrated example receives demographic information from a user (e.g., a member of the household 104, an agent from an audience measurement company, etc.) and transmits the demographic information to the data store manager 404 for association with monitoring information. In other words, the demographic interface 406 provides demographic information so that information about exposure to media content at the household 104 can be tied to demographic information associated with members of the household and guests. The demographic interface 406 may receive demographic information using any type of interface such as, for example, a graphical user interface provided at the home server 120, a remotely accessible graphical user interface, a demographic file received from a user or an agent of an audience measurement company), a people meter, etc. While the example home server 120 includes the demographic interface 406, the home server 120 may not include the demographic interface 406 when, for example, demographic interface is not desired or the data store manager includes an interface for receiving demographic information.

The data transmitter 410 of the illustrated example receives program information, advertisement information, activity information, and demographic information from the data store manager 404 and transmits the information to a central facility (e.g., the central facility 108). The data transmitter 410 may additionally receive requests for information from a central facility and transmit the requests to the data store manager 404. The data transmitter 410 of the illustrated example is implemented by a wired or wireless network card. However, any other communication device may be used to communicatively couple the home server 120 to a network (e.g., the home network 118).

FIG. 5 is a block diagram of an example implementation of the central facility 108 of FIG. 1. The example central facility 108 includes a data receiver 502, an advertisement ratings generator 504, a window selector 506, a metadata comparator 508, and a report generator 510.

The data receiver 502 of the illustrated example receives program information, advertisement information, activity information, and demographic information from a monitored location (e.g., the household 104 of FIG. 1). The data receiver 502 of the illustrated example is implemented by a wired or wireless network card. However, any other communication device may be used.

The advertisement ratings generator 504 of the illustrated example generates ratings information for received advertisements. Example ratings information indicates how many people have been presented with a particular advertisement. The ratings information may be generated by using any desired type(s) of formulas and/or techniques. In addition, the ratings information is grouped by demographic categories (e.g., ratings for ages 18-24, ratings for a particular race, ratings for particular gender, ratings for a particular geographic region, etc.). The generated ratings information is transmitted to the report generator 510.

The window selector 506 of the illustrated example selects activity information (e.g., webpage browsing, purchasing events, purchasing habits, computer use activity, etc.) that is associated with a time that is within a window of time for each advertisement. In other words, for each advertisement, event, data entry, etc., the example window selector 506 selects activity information for activities that took place within an amount of time beginning at a time of presentation of the advertisement and ending at some later time. For example, if a particular advertisement was presented on Jan. 18, 2008 at 6:35 PM, the window selector 506 would select all activities that took place within an amount of time from the time of broadcast of that advertisement to a certain time later (e.g., activity that occurred during the 24 hours following the advertisement). The window selector 506 transmits the advertisement (and associated metadata) and the selected activities (and associated metadata) to the metadata comparator 508. While the example window selector 506 selects activities that are within a certain time period, the window selector may alternatively transmit all activities to the metadata comparator 508 for analysis. Additionally or alternatively, the window selector 506 may operate in association with the metadata comparator 508 to select activities that include metadata identified by the metadata comparator 508. For example, after the metadata comparator 508 has identified activities within a window that are associated with an advertisement, the metadata comparator 508 may request additional activities that are associated with identified metadata. Such an analysis can be used to identify trends in activities that are affected by an advertisement (e.g., a user did not visit a particular webpage for a month and then visited the webpage within an hour of a presentation of an advertisement associated with the webpage).

The metadata comparator 508 of the illustrated example receives metadata associated with an advertisement and metadata associated with activities (e.g., activities at the computer 110 recorded by the activity monitor 122 of FIG. 1) and compares the metadata to identify associations. The example metadata comparator 508 determines if metadata associated with advertisements matches metadata associated with activity at the computer 110. For example, the metadata comparator 508 will indicate to the report generator that an advertisement is associated with an activity where the advertisement is for a product from a particular company and the activity is a visit to the webpage of the company or a search for that product or company using, for example, a search engine. The metadata comparator 508 may alternatively identify an association between an advertisement and an activity based on any other type of association such as, for example, based on keywords associated with an advertisement, based on a user input indicating an association with an advertisement (e.g., a user input of an identifier or term identified in the advertisement), based on signatures extracted from the advertisement and the activity, based on codes extracted from the advertisements and the activity, based on a watermark extracted from the advertisement and the activity, etc.

The report generator 510 of the illustrated example receives the advertisement ratings from the advertisement ratings generator 504 and the advertisement-to-activity association information from the metadata comparator 508 and generates reports based on the information. The report generator 510 of the illustrated example generates an electronic report listing the ratings information for each advertisement and listing the associated activities for each advertisement. Alternatively, any other type or format of report may be generated such as, for example, a comma separated values (CSV) file including the ratings information and/or association information, a printed report hard copy, a report listing information grouped by household, a report listing information grouped by demographic, a report listing information grouped by the company associated with each advertisement, etc. The generated reports may be analyzed by an agent of an audience measurement company, may be automatically sent to the company associated with each advertisement, may be automatically sent to a television network/broadcaster, may be made available on an internet webpage, etc.

While an example system 100 to monitor advertisement exposure has been illustrated in FIGS. 1 to 5, the devices, networks, systems, servers and/or processors illustrated in FIGS. 1 to 5 may be combined, divided, re-arranged, eliminated and/or implemented in any way. Further, the example the meter 116, the activity monitor 122, the home server 120, and/or the central facility 108 of FIG. 1; the digitizer 202, the segment analyzer 204 the advertisement detector 206, the program analyzer 208, the advertisement extractor 210, the compressor 212, the signature extractor 214, the code collector 215, the metadata builder 216, and/or the data transmitter 218 of FIG. 2; the offline activity monitor 302, the online activity monitor 304, the clock 306, and/or the data transmitter 308 of FIG. 3, the data receiver 402, the data store manager 404, the demographic interface 406, the data store 408, and/or the data transmitter 410; and/or the data receiver 502, the advertisement ratings generator 504, the window selector 506, the metadata comparator 508, and/or the report generator 510 and/or, more generally, the example system 100 may be implemented by hardware, software, firmware and/or any combination of hardware, software and/or firmware. Thus, for example, any or all of the example the meter 116, the activity monitor 122, the home server 120, and/or the central facility 108 of FIG. 1; the digitizer 202, the segment analyzer 204 the advertisement detector 206, the program analyzer 208, the advertisement extractor 210, the compressor 212, the signature extractor 214, the code collector 215, the metadata builder 216, and/or the data transmitter 218 of FIG. 2; the offline activity monitor 302, the online activity monitor 304, the clock 306, and/or the data transmitter 308 of FIG. 3, the data receiver 402, the data store manager 404, the demographic interface 406, the data store 408, and/or the data transmitter 410; and/or the data receiver 502, the advertisement ratings generator 504, the window selector 506, the metadata comparator 508, and/or the report generator 510 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example the meter 116, the activity monitor 122, the home server 120, and/or the central facility 108 of FIG. 1; the digitizer 202, the segment analyzer 204 the advertisement detector 206, the program analyzer 208, the advertisement extractor 210, the compressor 212, the signature extractor 214, the code collector 215, the metadata builder 216, and/or the data transmitter 218 of FIG. 2; the offline activity monitor 302, the online activity monitor 304, the clock 306, and/or the data transmitter 308 of FIG. 3, the data receiver 402, the data store manager 404, the demographic interface 406, the data store 408, and/or the data transmitter 410; and/or the data receiver 502, the advertisement ratings generator 504, the window selector 506, the metadata comparator 508, and/or the report generator 510 are hereby expressly defined to include a tangible medium such as a memory, a digital versatile disc (DVD), a compact disc (CD), etc. storing the software and/or firmware. Further still, the example system 100 may include additional devices, networks, systems, servers and/or processors in addition to, or instead of, those illustrated in FIGS. 1 to 5 and/or may include more than one of any or all of the illustrated devices, networks, systems, servers and/or processors.

The example flowchart of FIG. 6 begins when a meter (e.g., the meter 116 of FIG. 1) receives a media content stream, broadcast, etc. (e.g., media content transmitted from the receiver 114 to the television 112) (block 602). The meter digitizes segments of the received content (e.g., using the digitizer 202 of FIG. 2) (block 604). For example, the example digitizer 202 receives 180 seconds of content and digitizes the content as a segment. The meter then analyzes the digitized segment for the presence of an advertisement (e.g., using the segment analyzer 204 and the advertisement detector 206) (block 606). If an advertisement is not detected (e.g., a television program is assumed to fill the entire segment) (block 608), the meter analyzes the segment to determine program information (e.g., many techniques for metering television programs are known and the example program analyzer 208 may use any technique for metering the program) (block 610).

If an advertisement is detected in the segment (block 608), the advertisement is extracted from the segment (e.g., using the advertisement extractor 210) (block 612). Then, codes embedded in the media content are collected (e.g., using the code collector 506 and/or signatures of the advertisement are determined (e.g., using the signature extractor 214) (block 614). Next, the advertisement (or a copy thereof) is compressed to generate a copy of the advertisement having a reduced size (e.g., using the compressor 212) (block 616). Then, metadata associated with the advertisement is extracted from the advertisement and/or collected from the media content signal or equipment (e.g., the metadata builder 216 extracts metadata from the advertisement and the receiver 114 of FIG. 1) (block 618). The codes and/or signature information, the compressed advertisement, and collected metadata information are then sent to a home server via a home network (e.g., the data transmitter 218 transmits the information to the home server 120 via the home network 118).

As shown in the example flowchart of FIG. 6, after the program information is analyzed (block 610) or information is transmitted to the home server (block 620), control returns to block 602 to await the reception of further content. For example, a next segment of 180 seconds of content may be received and processed.

While FIG. 6 is described in conjunction with an example meter, the flowchart of FIG. 6 may alternatively be implemented by any other device such as, for example, the activity monitor 122.

Figure 7:
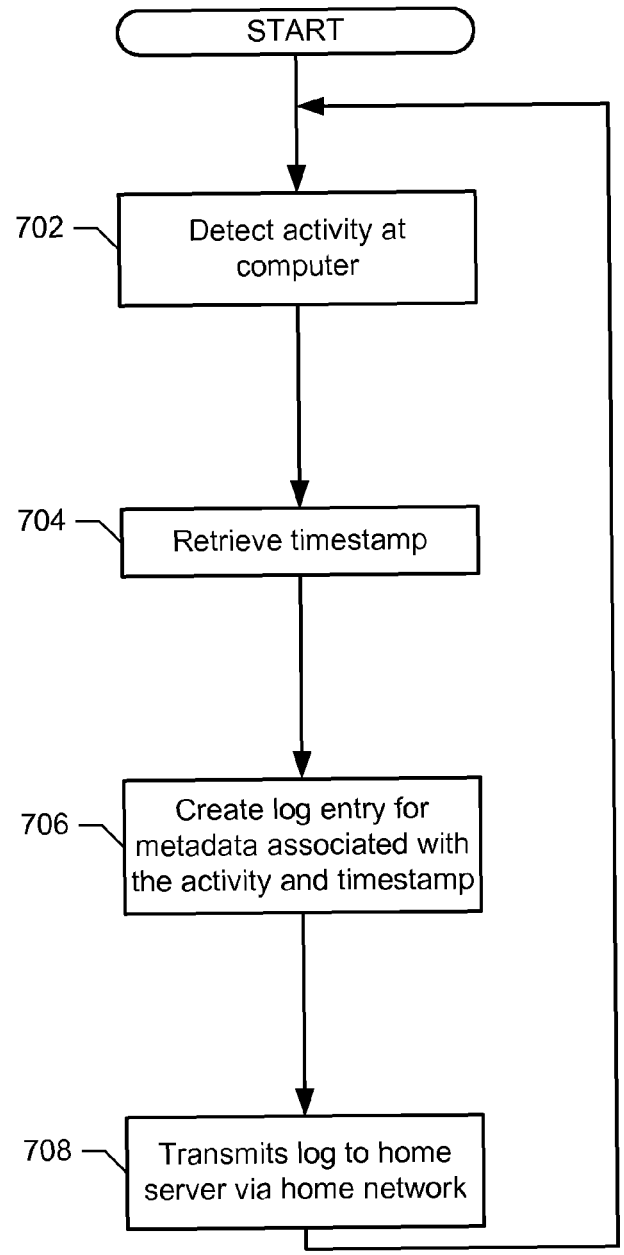
FIG. 7 is a flowchart representative of example machine readable instructions that may be executed to implement the activity monitor of FIG. 1.

The flowchart of FIG. 7 begins when an activity monitor (e.g., the activity monitor 122 at the computer 110 of FIG. 1) detects activity at the computer (e.g., using the offline activity monitor 302 and/or the online activity monitor 304 (block 702). Then, the activity monitor retrieves a timestamp for the activity (e.g., the data transmitter 308 retrieves a timestamp from the clock 306) (block 704). The activity monitor then creates a log entry identifying the activity (e.g., including metadata associated with the activity) and including the timestamp (block 706). The activity monitor then transmits the log entry to a home server (e.g., the home server 120) via a home network (e.g., the home network 118) (block 708). The activity monitor may additionally store log entries until a desired amount of entries has been stored or an amount of time has passed and may then send the log entries to the home server. After the generated log entry has been transmitted (or stored), control returns to block 702 to await the detection of further activity at the computer.

While FIG. 7 is described in conjunction with an example activity monitor, the flowchart of FIG. 7 may alternatively be implemented by any other device such as, for example, the meter 116.

The flowchart of FIG. 8 begins when a home server (e.g., the home server 120 of FIG. 1) receives data from a meter (e.g., the meter 116 of FIG. 1) and/or a activity monitor (e.g., the activity monitor 122 of FIG. 1) (block 802). The home server stores the received information in a data store (e.g., the data store 408 of FIG. 4) (block 804). The home server then determines if it is time to transmit information to a central facility (e.g., the central facility 108) (block 806). For example, the home server may determine that the data store has reached a maximum capacity, that a request to transmit information has been received from a central facility, that a time limit has expired, etc. If the home server determines that it is not time to transmit the information (block 806), control returns to block 802 to await the reception of further data.

If the home server determines that it is time to transmit the information (block 806), the home server transmits the data stored in the data store to the central facility via a communication network (e.g., the communication network 106 of FIG. 1) (block 808). Then, the home server transmits demographic information (e.g., demographic information received from the demographic interface 406) to the central facility via the communication network (block 810). Alternatively, block 810 may not be implemented if the demographic information is stored in the database and is transmitted to the central facility in block 808. After the information has been transmitted to the central facility (blocks 808 and 810), control returns to block 802 to await the reception of further data.

While FIG. 8 is described in conjunction with an example home server, the flowchart of FIG. 8 may alternatively be implemented by any other device such as, for example, the central facility 108, the meter 116, or the activity monitor 122.

The flowchart of FIG. 9 begins when a central facility (e.g., the central facility 108 of FIG. 1) receives data from a home server (e.g., the home server 120 of FIG. 1) (block 902). The central facility then generates advertisement ratings (e.g., using the advertisement ratings generator 504) (block 904). The central facility then selects a first advertisement in the data received from the home server (block 906). Then, the central facility selects activity data in the received data that is temporally close to a presentation time of the advertisement (e.g., using the window selector 506) (block 908). The central facility then compares metadata associated with each selected activity datum with metadata associated with the advertisement (e.g., using the metadata comparator 508) (block 910). If no matches between metadata associated with an activity datum and the metadata associated with the advertisement is determined (block 910), control proceeds to block 914, which is described in further detail below.

If a match between metadata associated with an activity datum and metadata associated with the advertisement is determined (block 910), the central facility associates the activity datum with the advertisement (e.g., stores a record identifying both the activity datum and the advertisement, attaches an index to both the activity datum and the advertisement, etc.) (block 912).

After determining that none of the activity data is associated with the advertisement (block 910) or after associating an advertisement with one or more of the activity data (block 912), the central facility determines if it is time to generate reports (block 914). For example, the central facility may generate a report at predetermined time intervals or upon a user request. If it is not time to generate reports (block 914), control returns to block 902 to await further data from the home server.

If it is time to generate a report (block 914), the central facility generates a report of advertisement ratings and/or advertisements associated with activity information (block 918). Control then returns to block 902 to await further data from the home server. While the example flowchart of FIG. 9 illustrates that a report is generated after the receipt of data from a home server, a report may alternatively be generated after the reception of data from multiple home servers or during any other time.

While FIG. 9 is described in conjunction with an example central facility, the flowchart of FIG. 9 may alternatively be implemented by any other device such as, for example, the home server 120 of FIG. 1.

Figure 10:
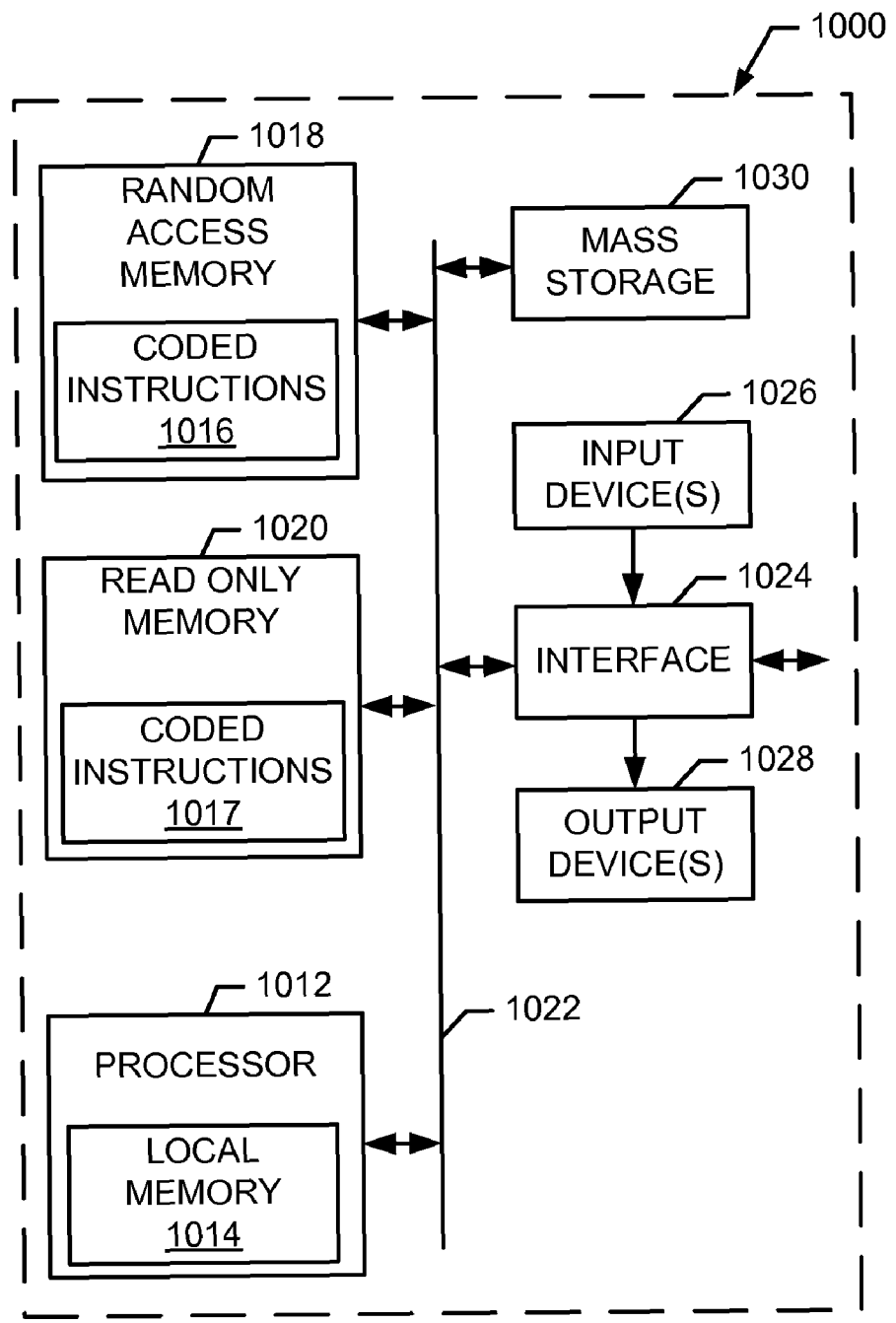
FIG. 10 is a block diagram of an example computer platform capable of executing the machine readable instructions illustrated in FIGS. 6-9 to implement the meter, the activity monitor, the home server, and/or the central facility of FIG. 1, and/or the other apparatus and/or methods disclosed herein.

FIG. 10 is a block diagram of an example computer platform 1000 capable of executing the machine readable instructions illustrated in FIGS. 6-9 to implement the meter 116, the activity monitor 122, the home server 120, and/or the central facility 108 of FIG. 1, and/or the other apparatus and/or methods disclosed herein.

The computer platform 1000 of the instant example includes a processor 1012 such as a general purpose programmable processor. The processor 1012 includes a local memory 1014, and executes coded instructions 1016 present in random access memory 1018, coded instruction 1017 present in the read only memory 1020, and/or instructions present in another memory device. The processor 1012 may execute, among other things, the machine readable instructions represented in FIGS. 6-9. The processor 1012 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1022. The volatile memory 1018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown) in a conventional manner.

The computer 1000 also includes a conventional interface circuit 1024. The interface circuit 1024 may be implemented by any type of well known interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, isopoint and/or a voice recognition system.

One or more output devices 1028 are also connected to the interface circuit 1024. The output devices 1028 can be implemented, for example, by display devices (e.g., a liquid crystal display, a cathode ray tube display (CRT), a printer and/or speakers). The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1000 also includes one or more mass storage devices 1030 for storing software and data. Examples of such mass storage devices 1030 include floppy disk drives, hard drive disks, compact disk drives and digital versatile disk (DVD) drives.

The example system 100 of FIG. 1 implements a system for correlating presentation of media content (e.g., an advertisement) with access to a communications network (e.g., webpages on the internet). The example system 100 enables an interested party (e.g., an advertiser) to monitor the effectiveness of advertisements at consumer locations by correlating presentation of an advertisement to a consumer with access of content available on the communications network (e.g., purchasing an item from a webpage) by the consumer. Accordingly, a direct cause an effect relationship can be determined. Information collected at consumer locations by the example system 100 can be transmitted to a central facility for aggregation and with other consumer locations further analysis of advertisement effectiveness.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for monitoring media content, the method comprising:
    determining via a meter that a media content segment was presented at a media content presentation device;
    logging via an activity monitor different than the meter an occurrence of an activity on a computing device different than the content presentation device, wherein the computing device is not in communication with the media content presentation device; and
    determining an association between the occurrence of the activity on the computing device and the presentation of the media content segment at the media content presentation device.

2. A method as defined in claim 1, wherein the activity comprises at least one of a accessing a webpage, a software application, or a media storage device.

3. A method as defined in claim 1, further comprising determining that the activity occurred within a period of time after presentation of the media content segment.

4. A method as defined in claim 3, wherein the period is less than or equal to twenty-four hours.

5. A method as defined in claim 1, further comprising:
    outputting an indication of the association between the of the activity and the presentation of the media content segment; and
    storing the indication in an electronic storage device.

6. A method as defined in claim 1, wherein logging the occurrence of the activity includes executing a software application on the computing device to monitor activity at the computing device.

7. A method as defined in claim 6, further comprising transmitting information about activity at the computing device to a home server.

8. A method as defined in claim 1, wherein determining that the media content was presented includes monitoring media content transmitted from a media content receiver to the media content presentation device.

9. A method as defined in claim 1, wherein the media content presentation device is at least one of a television or a radio.

10. A method as defined in claim 1, wherein the computing device is at least one of a mobile computing device, a personal digital assistant, a cellular telephone, a laptop computer, or a desktop computer.

11. A method as defined in claim 1, wherein determining the association between the occurrence of the activity on the computing device and the presentation of the media content segment includes comparing metadata associated with the occurrence of the activity to metadata associated with the presentation of the media content segment.

12. A method as defined in claim 1, wherein determining the association between the occurrence of the activity on the computing device and the presentation of the media content segment includes comparing a code associated with the occurrence of the activity to a code extracted from the media content segment.

13. A method as defined in claim 1, wherein determining the association between the occurrence of the activity on the computing device and the presentation of the media content segment includes:
    obtaining a first image associated with the activity;
    obtaining a second image in the media content segment; and
    comparing the first image to the second image.

14. A system for monitoring media content, the system comprising:
    an activity monitor to log an occurrence of an activity on a computing device;
    a meter different than the activity monitor to monitor a media content presentation device different than the computing device and to determine that a media content segment was presented at the media content presentation device, wherein the media content presentation device is not in communication with the computing device; and
    a central facility to determine an association between the occurrence of the activity on the computing device and the presentation of the media content segment on the media content presentation device, and to create a report based on the association.

15. A system as defined in claim 14, wherein the activity comprises at least one of a accessing a webpage, a software application, or a media storage device.

16. A system as defined in claim 14, wherein the central facility is to determine if the activity occurred within a threshold period of time after the presentation of the media content segment.

17. A system as defined in claim 14, wherein the central facility is to store the report in an electronic storage device.

18. A system as defined in claim 14, wherein the activity monitor is to indicate that the activity occurred by transmitting an indication to the central facility.

19. An apparatus for monitoring media content, the apparatus comprising:
    a data receiver to receive monitoring information about a presentation of a media content segment at a media content presentation device from a meter and to receive activity information associated with a computing device different than the media content presentation device from an activity monitor different than the meter, wherein the computing device is not in communication with the media content presentation device;

a window selector to select a subset of the activity information associated with the computing device, wherein the subset excludes activity information that did not occur after the presentation of the media content segment at the media content presentation device;

a metadata comparator to determine, based on the subset of the activity information associated with the computing device, that an activity related to the media content segment occurred at the computing device; and a report generator to indicate that the activity occurred.

20. An apparatus as defined in claim 19, wherein the activity comprises at least one of a accessing a webpage, a software application, or a media storage device.

21. An apparatus as defined in claim 19, wherein the window selector is further to exclude activity information that did not occur within a threshold period of time after the presentation of the media content segment.

22. A tangible machine readable medium storing instructions that, when executed, cause a machine to at least:

determine that a media content segment was presented at a media content presentation device;

log an occurrence of an activity on a computing device different than the content presentation device, wherein the computing device is not in communication with the media content presentation device; and determine an association between the occurrence of the activity on the computing device and the presentation of the media content segment at the media content presentation device.

23. A machine readable medium as defined in claim 22, wherein the instructions further cause the machine to determine that the activity occurred within a threshold period of time after the presentation of the media content segment.

24. A machine readable medium as defined in claim 22, wherein the instructions further cause the machine to execute a software application on the computing device to monitor activity at the computing device.

\* \* \* \* \*

UNITED STATES PATENT AND TRADEMARK OFFICE
CERTIFICATE OF CORRECTION

PATENT NO. : 8,302,120 B2  
APPLICATION NO. : 12/204297  
DATED : October 30, 2012  
INVENTOR(S) : Arun Ramaswamy Page 1 of 1

It is certified that error appears in the above-identified patent and that said Letters Patent is hereby corrected as shown below:

In the Specification:

Column 15, line 21:
replace "Accordingly, a direct cause an effect relationship can be" with
--Accordingly, a direct cause and effect relationship can be--.

Column 15, line 24:
replace "for aggregation and with other consumer locations further" with
--for aggregation with other consumer locations for further--.

In the Claims:

Column 15, line 55, claim 5: after "between the" add --occurrence--.

Signed and Sealed this  
Seventh Day of January, 2014

Margaret A. Focarino  
*Commissioner for Patents of the United States Patent and Trademark Office*